United States Patent
Fuchimoto

(10) Patent No.: US 9,791,821 B2
(45) Date of Patent: Oct. 17, 2017

(54) DOCUMENT CONVEYANCE APPARATUS AND IMAGE FORMING APPARATUS

(71) Applicant: KYOCERA Document Solutions Inc., Osaka-shi, Osaka (JP)

(72) Inventor: Nobuyuki Fuchimoto, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 111 days.

(21) Appl. No.: 14/716,897

(22) Filed: May 20, 2015

(65) Prior Publication Data

US 2015/0338821 A1 Nov. 26, 2015

(30) Foreign Application Priority Data

May 20, 2014 (JP) .............................. 2014-104445

(51) Int. Cl.
| | |
|---|---|
| *B65H 7/02* | (2006.01) |
| *G03G 21/16* | (2006.01) |
| *B65H 7/20* | (2006.01) |
| *B65H 1/26* | (2006.01) |
| *B65H 5/06* | (2006.01) |
| *B65H 5/38* | (2006.01) |
| *B65H 7/00* | (2006.01) |
| *B65H 7/14* | (2006.01) |
| *G03G 15/00* | (2006.01) |
| *H04N 1/00* | (2006.01) |

(52) U.S. Cl.
CPC ......... *G03G 21/1633* (2013.01); *B65H 1/266* (2013.01); *B65H 5/06* (2013.01); *B65H 5/38* (2013.01); *B65H 7/00* (2013.01); *B65H 7/02* (2013.01); *B65H 7/14* (2013.01); *B65H 7/20* (2013.01); *G03G 15/00* (2013.01); *H04N 1/00* (2013.01); *G03G 15/6558* (2013.01)

(58) Field of Classification Search
CPC ................ B65H 7/02; B65H 2511/528; B65H 2601/11; G03G 21/1633; G03G 21/1638; G03G 2215/00341; H04N 1/00689; H04N 1/0051

See application file for complete search history.

(56) References Cited

U.S. PATENT DOCUMENTS 9,195,194 B2 * 11/2015 Kishimoto ............. G03G 15/55
2015/0168906 A1 * 6/2015 Ishii ....................... G03G 15/70
399/21

FOREIGN PATENT DOCUMENTS

| JP | 2008124582 A | 5/2008 |
|---|---|---|
| JP | 2011191630 A | 9/2011 |

* cited by examiner

*Primary Examiner* — Michael C McCullough

(57) ABSTRACT

A document conveyance apparatus includes a document conveyance section, a cover, an opening and closing detection sensor, a document detection sensor, and a control section. The control section detects opening and closing of the cover on the basis of an output value of the opening and closing detection sensor and detects whether or not there is a document in a predetermined detection position on the basis of the output value of the document detection sensor. If, when the output value of the document detection sensor has changed from a value indicating an opened state of the cover to a value indicating a closed state thereof, the output value of the document detection sensor is a value indicating that there is the document, the control section detects a half-closed state where the cover is not completely closed.

6 Claims, 9 Drawing Sheets

DOCUMENT CONVEYANCE APPARATUS AND IMAGE FORMING APPARATUS

INCORPORATION BY REFERENCE

The disclosure of Japanese Patent Application No. 2014-104445 filed on May 20, 2014, including the specification, drawings and abstract is incorporated herein by reference in its entirety.

BACKGROUND

This disclosure relates to a document conveyance apparatus and an image forming apparatus.

There are cases where, in an image forming apparatus including an image reading section that performs reading of a document, a document conveyance apparatus that conveys the document to a reading position of the image reading section is mounted.

A typical document conveyance apparatus includes a cover attached to an apparatus body so as to be openable and closable. One conveyance guide that defines a document conveyance path is provided at an inner surface of the cover. The other conveyance guide that makes a pair with the one conveyance guide is fixed to an inner part of the apparatus. Therefore, when the cover is opened, the conveyance guides of the pair separate from each other, and thus, an inner side of the document conveyance path is exposed. Therefore, the cover is opened when a jam (a paper jam) or the like occurs in the document conveyance path.

SUMMARY

According to an aspect of the present disclosure, a document conveyance apparatus includes a document conveyance section, a cover, an opening and closing detection sensor, a document detection sensor, and a control section. The document conveyance section feeds a document to a document conveyance path and conveys the document along the document conveyance path. The cover is attached to an apparatus body so as to be openable and closable and causes, when being opened, an inner side of the document conveyance path to be exposed. The opening and closing detection sensor causes an output value to change in accordance with opening and closing of the cover. The document detection sensor causes an output value to change in accordance with whether or not there is the document in a predetermined detection position of the document conveyance path. The document detection sensor outputs, when the cover is not completely closed, a value indicating that there is the document. The control section detects opening and closing of the cover on the basis of the output value of the opening and closing detection sensor and detects whether or not there is the document in the predetermined detection position on the basis of the output value of the document detection sensor. If, when the output value of the opening and closing detection sensor has changed from a value indicating an opened state of the cover to a value indicating a closed state thereof, the output value of the document detection sensor is a value indicating that there is the document, the control section detects a half-closed state where the cover is not completely closed.

DETAILED DESCRIPTION

An embodiment will be described below using, as an example, a multifunctional peripheral including a plurality of types of functions, such as a printer function, a copy function, and the like, mounted therein.

Entire Configuration of Multifunctional Peripheral

Figure 1:
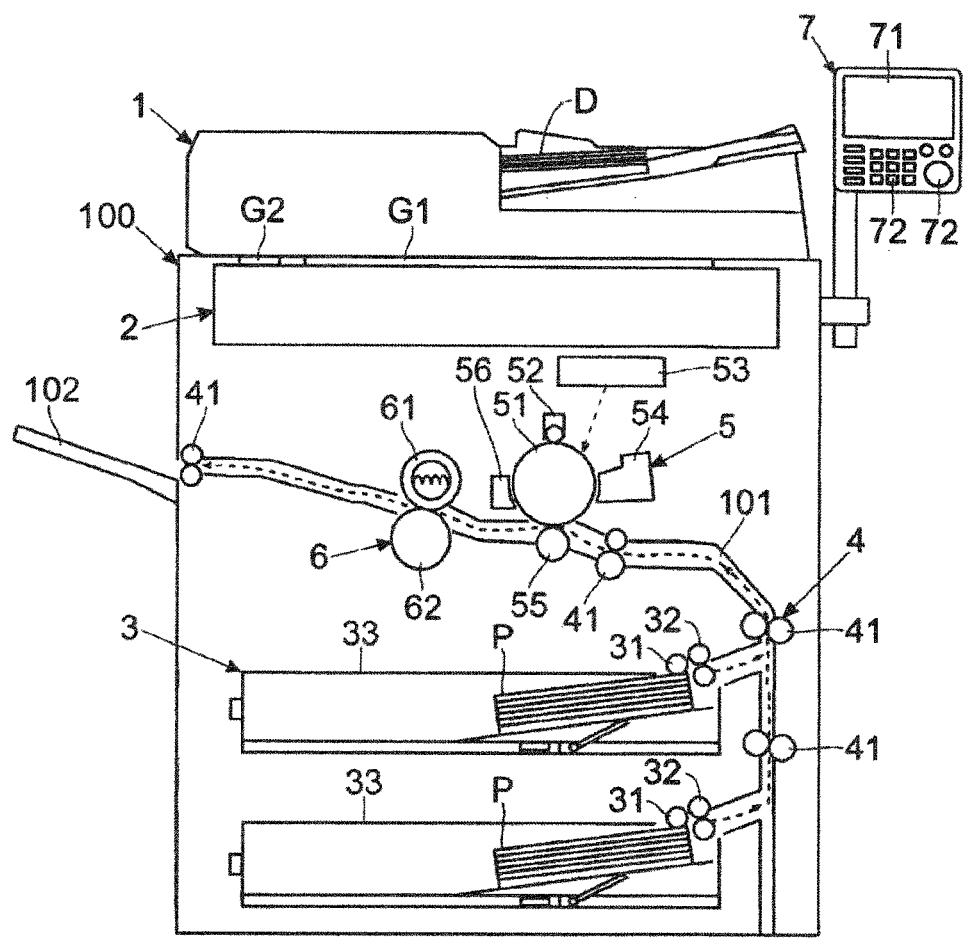
FIG. 1 is a view of a multifunctional peripheral including a document conveyance apparatus according to an embodiment.

As illustrated in FIG. 1, a document conveyance apparatus 1 is mounted in a multifunctional peripheral 100 according to this embodiment as an image forming apparatus. Note that a configuration of the document conveyance apparatus 1 will be described in detail later. The multifunctional peripheral 100 includes an image reading section 2, a paper feeding section 3, a paper conveyance section 4, an image forming section 5, and a fixing section 6.

The image reading section 2 is capable of executing placement reading and conveyance reading. When performing placement reading, the image reading section 2 reads a document D placed on a contact glass G1 and generates image data. When performing conveyance reading, the image reading section 2 reads the document D that is conveyed on a contact glass G2 with the document conveyance apparatus 1 and generates image data.

The paper feeding section 3 includes a pickup roller 31 and a paper feeding roller pair 32 and feeds a paper P housed in a paper cassette 33 to a paper conveyance path 101. The paper conveyance section 4 includes a plurality of conveyance roller pairs 41, conveys the paper P along the paper conveyance path 101, and discharges the paper P for which printing is done to a paper discharge tray 102.

The image forming section 5 includes a photoreceptor drum 51, a charging device 52, an exposure device 53, a developing device 54, a transfer roller 55, and a cleaning device 56. The image forming section 5 forms a toner image on the basis of image data and transfers the toner image on the paper P. The fixing section 6 includes a heating roller 61 and a pressurizing roller 62, and heats and pressurizes the toner image transferred on the paper P to fix the toner image on the paper P.

The multifunctional peripheral 100 includes an operation panel 7 as a report section. The operation panel 7 includes a display panel 71 provided with a touch panel. The display panel 71 displays a message that reports an apparatus state to a user and displays a soft key that receives various types of settings from a user. Hard keys 72, such as a ten key, a start key, and the like, are provided in the operation panel 7.

Configuration of Document Conveyance Apparatus

Figure 2:
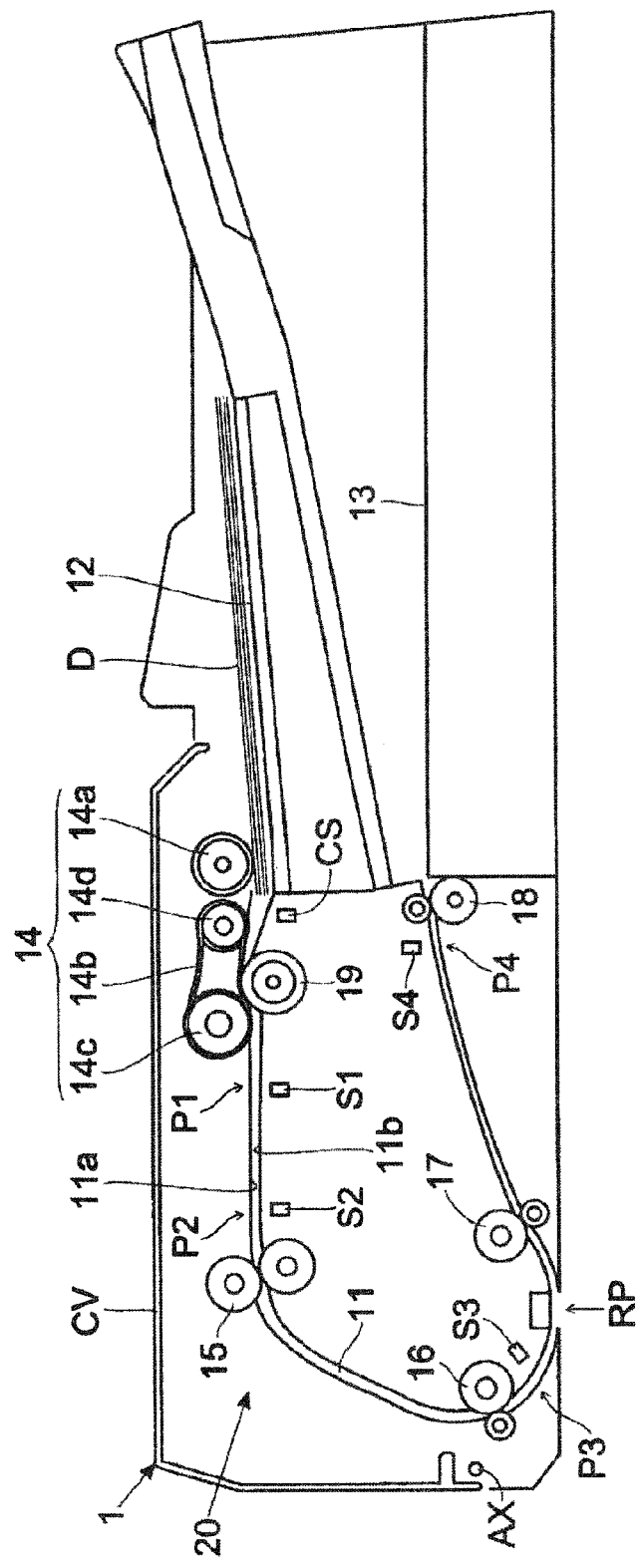
FIG. 2 is a view of a document conveyance apparatus according to the embodiment.

As illustrated in FIG. 2, the document conveyance apparatus 1 includes a document conveyance path 11 used for conveying the document D to a reading position RP (a position on the contact glass G2) of the image reading section 2. The document conveyance apparatus 1 feeds the document D set in the document set tray 12 to the document conveyance path 11 and conveys the document D along the document conveyance path 11. When the document D passes the reading position RP, reading of the document D is performed by the image reading section 2 (conveyance reading). Thereafter, the document D that has undergone reading is discharged to a document discharge tray 13.

As described above, the document D is conveyed along the document conveyance path 11, and therefore, the document conveyance apparatus 1 includes a document conveyance section 20. The document conveyance section 20 includes a paper feeding unit 14, a registration roller pair 15, a conveyance roller pair 16, a conveyance roller pair 17, and a conveyance roller pair 18.

The paper feeding unit 14 is disposed in an end part of the document conveyance path 11 at an upstream side in a conveyance direction of the document D, pulls out the document D from the document set tray 12, and feeds the document D to the document conveyance path 11. The paper feeding unit 14 includes a pickup roller 14a and a paper feeding belt 14b. The pickup roller 14a pulls out the document D from the document set tray 12, and the paper feeding belt 14b feeds the document D pulled out from the document set tray 12 to the document conveyance path 11.

The paper feeding belt 14b is stretched by a drive roller 14c and a driven roller 14d, and revolves due to rotation of the drive roller 14c. Thus, when the document D pulled out from the document set tray 12 contacts the paper feeding belt 14b, the document D is fed to the document conveyance path 11.

A separation roller 19 is provided in a position facing to the paper feeding belt 14b with the document conveyance path 11 interposed therebetween. When the paper feeding belt 14b revolves, the separation roller 19 rotates in a direction in which the document D is returned back to the upstream side in the conveyance direction of the document D. Thus, if a plurality of documents D are piled up, a top one of the documents D (which contacts a paper feeding belt 14b) is sent to a downstream side in the conveyance direction of the document D by the paper feeding belt 14b. On the other hand, a bottom one of the documents D (which contacts the separation roller 19) is returned back to the upstream side in the conveyance direction of the document D by the separation roller 19 (or stays at the position). Thus, the plurality of documents D that are piled up are separated.

The registration roller pair 15 is disposed in a position located at the downstream side of the paper feeding unit 14 in the conveyance direction of the document D and at the upstream side in the conveyance direction of the document D, as compared to the conveyance roller pairs 16 to 18. The registration roller pair 15 temporarily stops the document D, deflects the document D, and thus, corrects a skew of the document D. That is, the registration roller pair 15 does not rotate when a front end of the document D reaches the registration roller pair 15, and starts rotating after the front end of the document D has reached the registration roller pair 15.

The conveyance roller pairs 16 to 18 are disposed in this order from the upstream side toward the downstream side in the conveyance direction of the document D. The conveyance roller pairs 16 to 18 convey the document D sent from the registration roller pair 15 to the reading position RP, and discharges the document D to the document discharge tray 13.

The document conveyance apparatus 1 includes a cover CV attached to the apparatus body so as to be openable and closable. The cover CV is opened and closed (rotates) with a rotation axis AX, which is placed in a left end part when viewed from the front, serving as a fulcrum. When the cover CV is closed, peripheral parts of the paper feeding unit 14 and the registration roller pair 15 are covered by the cover CV so as not to be exposed.

One conveyance guide 11a that defines the document conveyance path 11 is provided on an inner surface of the cover CV. The other conveyance guide 11b that makes a pair with the one conveyance guide 11a is fixed to an inner part of the apparatus. Thus, when the cover CV is opened, the conveyance guides 11a and 11b are separated from each other, and therefore, an inner side of the document conveyance path 11 is exposed. Therefore, when a jam (a paper jam) or the like occurs on the document conveyance path 11, the cover CV is opened by a user. Note that, for example, the paper feeding unit 14 is attached to the cover CV and one roller (an upper roller) of the registration roller pair 15 is also attached to the cover CV. Accordingly, when the cover CV is opened, the paper feeding unit 14 and the upper roller of the registration roller pair 15 move with the cover CV.

The document conveyance apparatus 1 includes document detection sensors S1, S2, S3, and S4 each of which is configured to detect whether or not there is the document D and count a conveyance timing of the document D. The document detection sensor S1 is a sensor that detects whether or not there is the document D in a detection position P1 as a predetermined detection position located at the downstream side of the paper feeding unit 14 in the conveyance direction of the document D on the document conveyance path 11. The document detection sensor S2 is a sensor that detects whether or not there is the document D in a detection position P2 located at the upstream side of the registration roller pair 15 in the conveyance direction of the document D on the document conveyance path 11. The document detection sensor S3 is a sensor that detects whether or not there is the document D in a detection position P3 located at the upstream side of the reading position RP in the conveyance direction of the document D on the document conveyance path 11. The document detection sensor S4 is a sensor that detects whether or not the document D around an exit port to the document discharge tray 13 on the document conveyance path 11.

The document detection sensors S1 to S4 are, for example, transmission type optical sensors each of which includes a light emitting section and a light receiving section. Each of outputs of the document detection sensors S1 to S4 varies between when there is the document D in the corresponding one of the detection positions P1 to P4 and when there is not the document D in the corresponding one of the detection positions P1 to P4. A specific example will be described below with reference to FIG. 3 and FIG. 4, using the document detection sensor S1 as an example.

Figure 3:
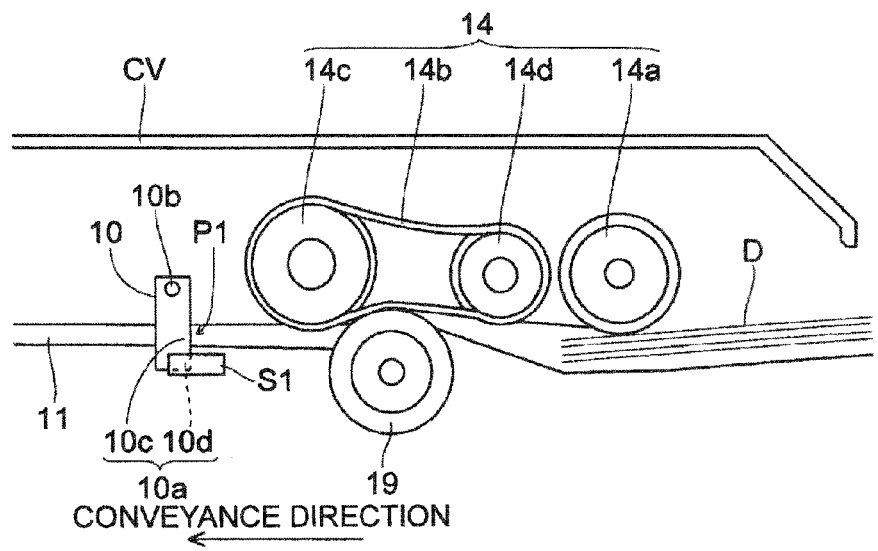
FIG. 3 is a view illustrating a positional relationship (when there is not a document in a detection position) between a document detection sensor and an actuator that are installed in a document conveyance apparatus according to the embodiment.
Figure 4:
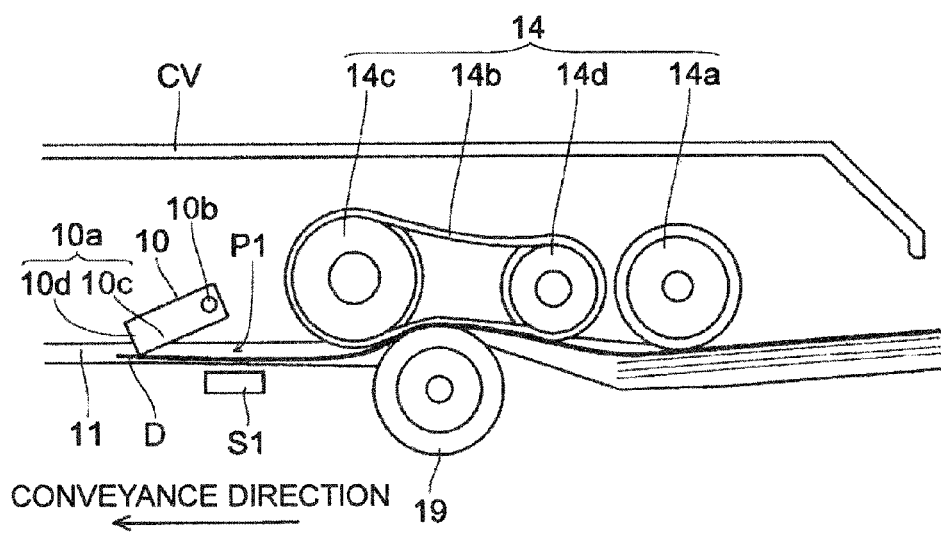
FIG. 4 is a view illustrating a positional relationship (when there is a document in a detection position) between the document detection sensor and the actuator that are installed in the document conveyance apparatus according to the embodiment.

As illustrated in FIG. 3 and FIG. 4, an actuator 10 is pivotally attached to the cover CV. That is, a revolving part 10a of the actuator 10 is configured to revolve with a revolving axis 10b, which is placed on the cover CV, serving as a fulcrum. The revolving part 10a of the actuator 10 includes a contact part 10c and a detected part 10d.

When there is not the document D in the detection position P1 corresponding to the document detection sensor S1, the revolving part 10a of the actuator 10 becomes still at the downstream side relative to the revolving axis 10b due to the weight of the actuator 10. Thus, the detected part 10d of the actuator 10 is disposed in the detection position P1 (a state of FIG. 3).

Then, when the front end of the document D reaches the detection position P1, the contact part 10c of the actuator 10 contacts the document D, and the contact part 10c of the actuator 10 is pressed in the conveyance direction. Thus, the revolving part 10a of the actuator 10 revolves upward. That is, the detected part 10d of the actuator 10 moves relative to the detection position P1 (a state of FIG. 4). Thereafter, when a rear end of the document D has completely passed the detection position P1, the revolving part 10a of the actuator 10 revolves downward due to the weight of the actuator 10, and the detected part 10d of the actuator 10 returns back to an original position (the state of FIG. 3).

In this case, as for the document detection sensor S1, when the detected part 10d of the actuator 10 is positioned at the detection position P1, the detected part 10d of the actuator 10 blocks a detection area (an optical path between the light emitting section and the light receiving section) of the document detection sensor S1 and, when the detected part 10d of the actuator 10 moves relative to the detection position P1, the detected part 10d of the actuator 10 is positioned in a position off the detection area of the document detection sensor S1. Thus, the document detection sensor S1 causes an output value to vary between when the detected part 10d of the actuator 10 is located in the detection position P1 and when the detected part 10d of the actuator 10 moved relative to the detection position P1. That is, the output value of the document detection sensor S1 varies between when there is the document D in the detection position P1 and when there is not the document D in the detection position P1.

Note that, although not illustrated, for each of the document detection sensors S2 to S4, similar to the document detection sensor S1, using an actuator that revolves as the front end of the document D reaches a corresponding one of the document detection sensors S2 to S4 and the rear end thereof passes the corresponding one of the document detection sensors S2 to S4, an output value varies between when there is the document D in the corresponding one of the detection positions P2 to P4 and when there is not the document D in the corresponding one of the detection positions P2 to P4. However, each of actuators corresponding to the document detection sensors S2 to S4 is pivotally attached to, not the cover CV, a member, such as a frame and the like, which is fixed in the apparatus.

Returning to FIG. 2, the document conveyance apparatus 1 includes an opening and closing switch CS as an opening and closing detection sensor, which is configured to detect opening and closing of the cover CV. The opening and closing switch CS is disposed in a peripheral part of the paper feeding unit 14, and switches on and off in accordance with opening and closing of the cover CV. Specifically, the opening and closing switch CS turns off when the cover CV is opened. Then, as the cover CV is closed, the opening and closing switch CS is pressed in by a rib (not illustrated) provided on the cover CV, and turns on before the cover CV is completely closed.

Hardware Configuration of Multifunctional Peripheral

Figure 5:
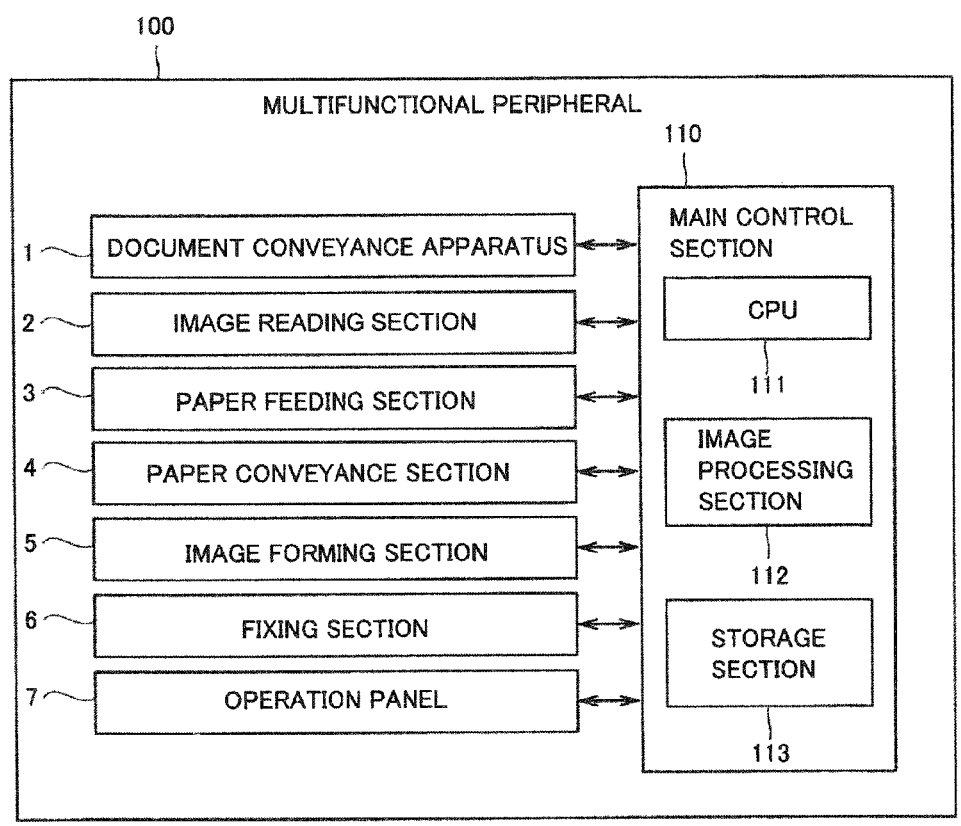
FIG. 5 is a block diagram illustrating a hardware configuration of the multifunctional peripheral including the document conveyance apparatus according to the embodiment.

As illustrated in FIG. 5, the multifunctional peripheral 100 includes a main control section 110. The main control section 110 includes a CPU 111, an image processing section 112, and a storage section 113. The image processing section 112 is formed of an ASIC exclusive for image processing, or the like, and performs image processing (magnification/reduction, concentration conversion, data format conversion, and the like) on image data. The storage section 113 is formed of a ROM, RAM, or the like, and stores a program and data used for control. The main control section 110 controls an operation of the multifunctional peripheral 100 on the basis of the program and data stored in the storage section 113.

Specifically, the main control section 110 is coupled to the image reading section 2, the paper feeding section 3, the paper conveyance section 4, the image forming section 5, and the fixing section 6, and controls a reading operation and a print operation. The main control section 110 is coupled to the operation panel 7, controls a display operation of the operation panel 7, and detects an operation performed on the operation panel 7. Furthermore, the main control section 110 is coupled to the document conveyance apparatus 1. Then, the main control section 110 controls a conveyance operation of the document D by the document conveyance apparatus 1 (gives an instruction to a document conveyance control section 120, which will be described later).

Figure 6:
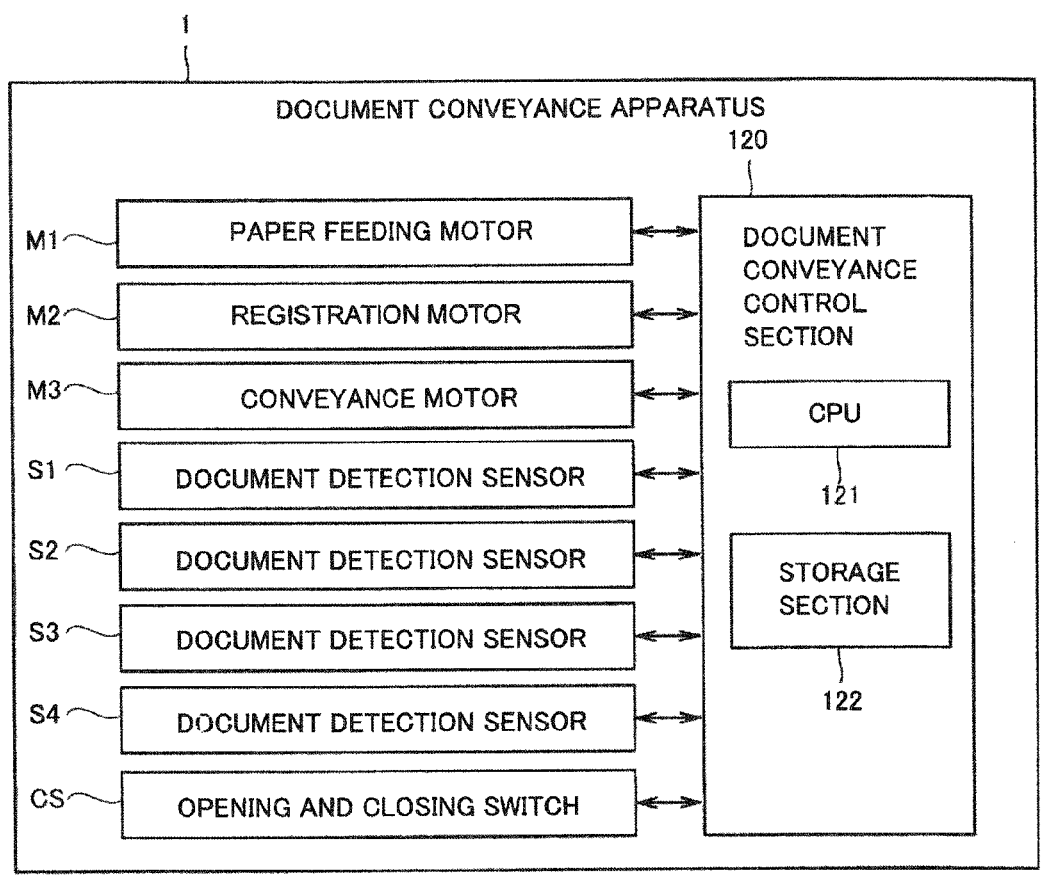
FIG. 6 is a block diagram illustrating a hardware configuration of the document conveyance apparatus according to the embodiment.

As illustrated in FIG. 6, the document conveyance apparatus 1 includes the document conveyance control section 120 coupled to the main control section 110. Note that the document conveyance control section 120 as a control section includes a CPU 121 and a storage section 122. The document conveyance control section 120 receives an instruction from the main control section 110, and controls a conveyance operation of the document conveyance apparatus 1.

Specifically, the document conveyance control section 120 controls driving of a paper feeding motor M1, a registration motor M2, and a conveyance motor M3, rotates a roller connected to each motor, and stops rotation. Note that the paper feeding motor M1 is a motor that drives the paper feeding unit 14, the registration motor M2 is a motor that drives the registration roller pair 15, and the conveyance motor M3 is a motor that drives the conveyance roller pairs 16 to 18.

The document conveyance control section 120 detects whether or not there is the document D in the corresponding one of the detection positions P1 to P4 on the basis of each of outputs of the document detection sensors S1 to S4.

Furthermore, on the basis of each of outputs of the document detection sensors S1 to S4, the document conveyance control section 120 detects reach of the front end of the document D and passing of the rear end thereof in the corresponding one of the detection positions P1 to P4, and determines whether or not a jam (a paper jam) has occurred on the document conveyance path 11.

In order to determine whether or not a jam has occurred, the document conveyance control section 120 detects reach of the front end of the document D in the detection position of a document detection sensor (a first sensor) among the document detection sensors S1 to S4, and then, starts clocking. Then, when a predetermine time has elapsed since reach of the front end of the document D was detected in the detection position of the first sensor, the document conveyance control section 120 detects whether or not the front end of the document D has reached the detection position of an document detection sensor (a second sensor) located at the downstream side in the conveyance direction, as compared to the first sensor. As a result, if the document conveyance control section 120 does not detect reach of the front end of the document D, the document conveyance control section 120 determines that a jam has occurred. The predetermined time in this case is a time which it takes for the document D to move between the detection position of the first sensor and the detection position of the second sensor, and may be calculated in advance on the basis of a distance between the detection position of the first sensor and the detection position of the second sensor and a conveyance speed.

As another alternative, if passing of the rear end of the document D is not detected in the same detection position even when the predetermined time has elapsed since reach of the front end of the document D was detected in the detection position of a document detection sensor among the document detection sensors S1 to S4, the document conveyance control section 120 determines that a jam has occurred. The predetermined time in this case is a time which it takes for the rear end of the document D to pass the same detection position from a time when the front end of the document D reached the detection position of the document detection sensor, and may be calculated in advance on the basis of a document size (the length thereof in the conveyance direction) and the conveyance speed.

The document conveyance control section 120 determines, on the basis of an output of the opening and closing switch CS, whether the cover CV is in an opened state or a closed state. If the cover CV is in an opened state, the document conveyance control section 120 notifies the main control section 110 that the cover CV is in an opened state. The main control section 110 that has received the notification causes the operation panel 7 to display a message that urges to close the cover CV. Note that, if the cover CV is in an opened state, the document conveyance control section 120 does not start feeding the document D to the document conveyance path 11. That is, when the cover CV is in an opened state, a job with conveyance reading is not executed.

Detection of Half-Closed State of Cover

Opening and closing of the cover CV of the document conveyance apparatus 1 is detected by the opening and closing switch CS. However, the opening and closing switch CS turns on before the cover CV is completely closed. That is, an output value of the opening and closing switch CS is a value indicating a closed state of the cover CV. Therefore, depending on cases, the opening and closing switch CS is on but the cover CV is not actually completely closed. For example, if a foreign object is sandwiched between the cover CV and the apparatus body, if the cover CV is deformed, or if the assembly accuracy of the cover CV is poor, a part of the cover CV raises and the cover is not completely closed even when a user thinks that the user closed the cover CV. Note that, in the following description, a state where the cover CV is completely closed is merely referred to as a closed state, and a state where the opening and closing switch CS is on but the cover CV is not completely closed is referred to as a half-closed state.

As described above, when the cover CV is in a half closed state, the opening and closing switch CS turns on. Therefore, whether or not the cover CV is in a half-closed state is not detected on the basis of only the output value of the opening and closing switch CS. However, the output value of the document detection sensor S1 varies between when the cover CV is in a half-closed state and when the cover CV is in a closed state.

Figure 7:
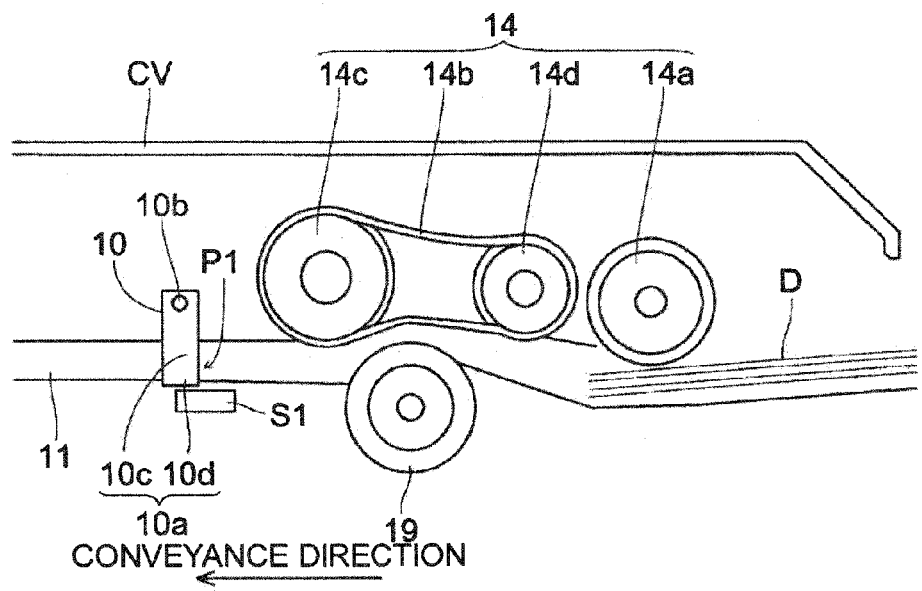
FIG. 7 is a view illustrating a positional relationship (when the cover is in a half-closed state) between the document detection sensor and the actuator that are installed in the document conveyance apparatus according to the embodiment.

Specifically, when the cover CV is in a closed state, the detected part 10d of the actuator 10 is located in the detection position P1, and the detection area of the document detection sensor S1 is blocked by the detected part 10d of the actuator 10 (see FIG. 3). Therefore, the output value of the document detection sensor S1 is a value indicating that there is not the document D. On the other hand, when the cover CV is in a half-closed state, the cover CV is not completely closed, and thus, the arrangement position of the detected part 10d of the actuator 10 is shifted upward from the arrangement position of the detected part 10d when the cover CV is in a closed state. Therefore, as illustrated in FIG. 7, the detected part 10d of the actuator 10 is located in a position off from the detection area of the document detection sensor S1. Thus, the output value of the document detection sensor S1 is a value indicating that there is the document D.

Then, when the output value of the opening and closing switch CS has changed from a value indicating an opened state of the cover CV to a value indicating a closed state thereof, the document conveyance control section 120 confirms the output value of the document detection sensor S1. If the output value of the document detection sensor S1 is a value indicating that there is the document D, the document conveyance control section 120 detects that the cover CV is in a half-closed state.

Figure 8:
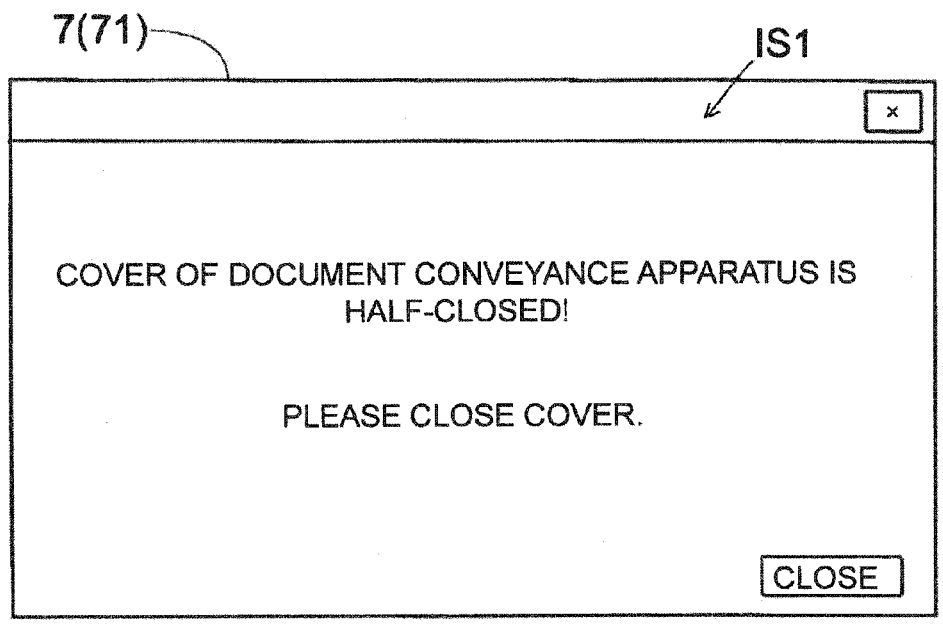
FIG. 8 is a view illustrating an example of a report screen displayed in the document conveyance apparatus according to the embodiment.

When the document conveyance control section 120 detects that the cover CV is in a half-closed state, the document conveyance control section 120 notifies the main control section 110 that the cover CV is in a half-closed state. The main control section 110 that received the notification causes the operation panel 7 to display a report screen IS1 (see FIG. 8) that reports that the cover CV is in a half-closed state. For example, the operation panel 7 displays, as the report screen IS1, a screen on which a message that the cover CV is in a half-closed state, a message that urges to close the cover CV again, or the like.

When the cover CV is in a half-closed state, similar to when the cover CV is in an opened state, the document conveyance control section 120 does not start feeding the document D to the document conveyance path 11. That is, when the cover CV is in a half-closed state, a job with conveyance reading is not executed.

Figure 9:
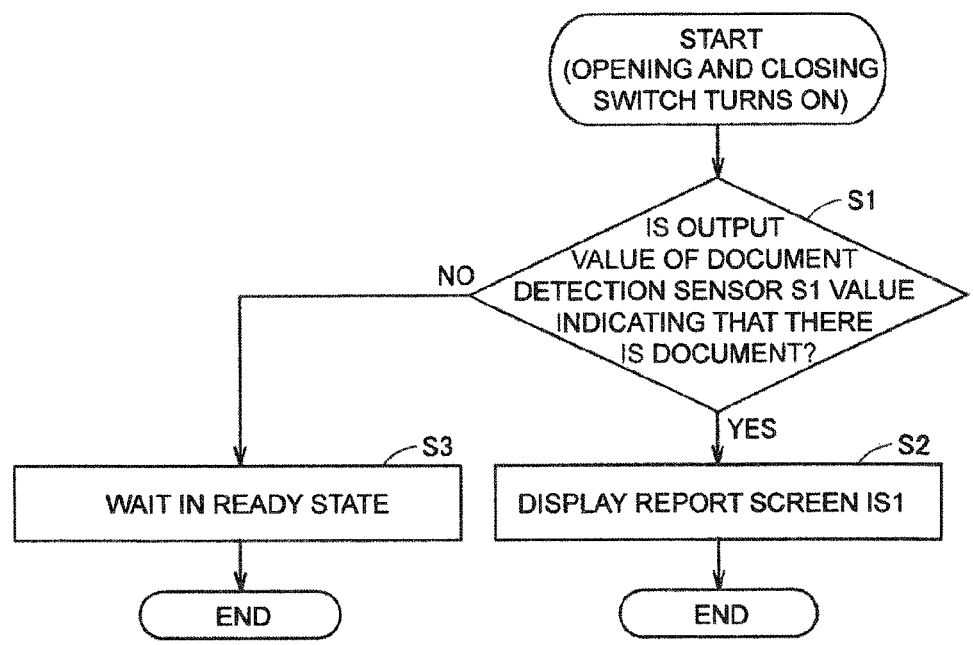
FIG. 9 is a flow chart illustrating an example of control performed when whether or not the cover is in a half-closed state in the document conveyance apparatus is determined according to the embodiment.

A flow of control performed when whether or not the cover CV is in a half-closed state will be described below with reference to a flow chart illustrated in FIG. 9. Note that start of the flow chart illustrated in FIG. 9 is when the output value of the opening and closing switch CS has changed from a value indicating an opened state of the cover CV to a value indicating a closed-state thereof. That is, control starts when the opening and closing switch CS changed from an off state to an on state.

In Step S1, the document conveyance control section 120 determines whether or not the output value of the document detection sensor S1 is a value indicating that there is the document D. As a result, if the output value of the document detection sensor S1 is a value indicating that there is the document D, the process proceeds to Step S2.

When the process proceeds to Step S2, the document conveyance control section 120 notifies the main control section 110 of a determination result of Step S1. The main control section 110 that has received the notification causes the operation panel 7 to report that the cover CV is in a half-closed state. That is, the operation panel 7 displays the report screen IS1 illustrated in FIG. 8.

On the other hand, in Step S1, if the output value of the document detection sensor S1 is a value indicating that there is not the document D, the process proceeds to Step S3. When the process proceeds to Step S3, the document conveyance control section 120 causes the document conveyance apparatus 1 to wait in a ready state. That is, the document conveyance control section 120 causes the document conveyance apparatus 1 to wait in a state where conveyance of the document D may be performed. Also, the document conveyance control section 120 notifies the main control section 110 that the document conveyance apparatus 1 is in a ready state.

Incidentally, the cover CV is opened when a jam has occurred or the like. Therefore, there are cases where, before the output value of the opening and closing switch CS changes from a value indicating an opened state of the cover CV to a closed state thereof, the cover CV is opened because of the occurrence of a jam. In such a case, possible reasons why, although the output value of the opening and closing switch CS has changed from a value indicating an opened state to a value indicating a closed state, the output value of the document detection sensor S1 is a value indicating that there is the document D are that the cover CV is in a half-closed state or that the document D remains in the detection position P1 on the document conveyance path 11 (jam processing by a user has not been reliably performed).

Figure 10:
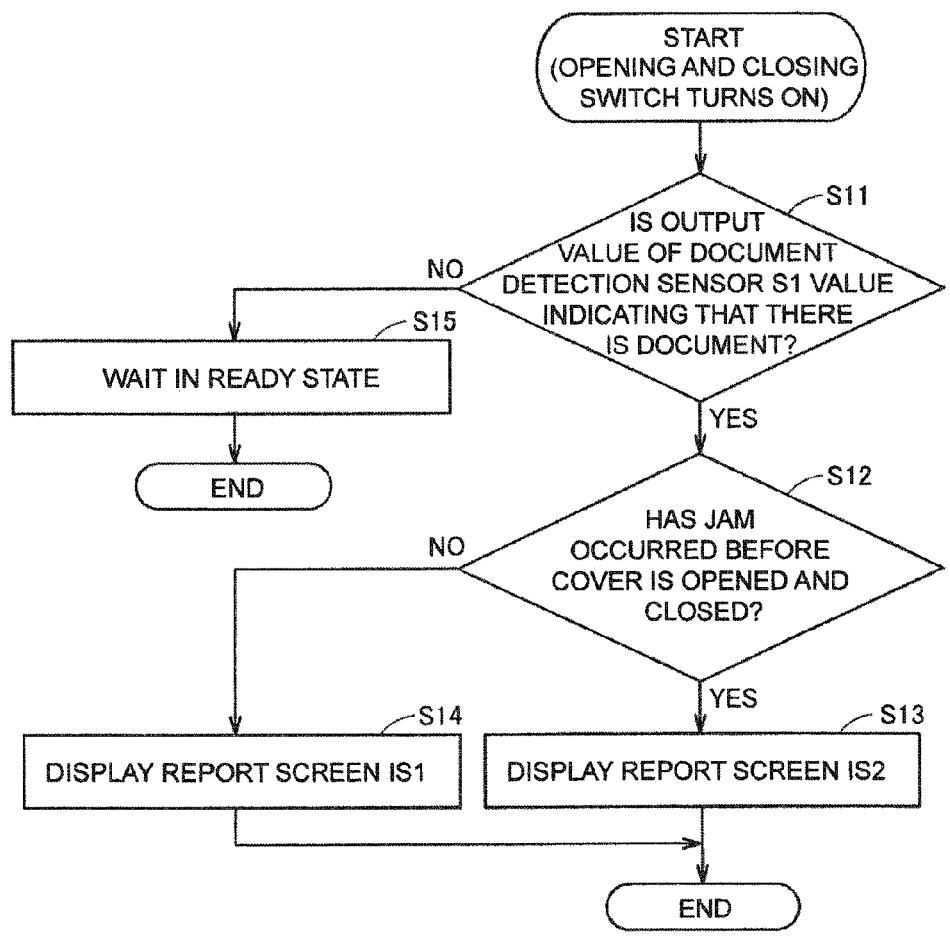
FIG. 10 is a flow chart illustrating another example of control performed when whether or not the cover is in the half-closed state in the document conveyance apparatus is determined according to the embodiment.

Thus, if, before the output value of the opening and closing switch CS changes from a value indicating an opened state of the cover CV to a closed state thereof, the cover CV is opened because of the occurrence of a jam, control in accordance with a flow chart illustrated in FIG. 10 may be performed. Note that start of the flow chart illustrated in FIG. 10 is when the output value of the opening and closing switch CS has changed from an opened state of the cover CV to a closed state thereof. That is, control starts when the opening and closing switch CS changed from an off state to an on state.

In Step S11, the document conveyance control section 120 determines whether or not the output value of the document detection sensor S1 is a value indicating that there is the document D. As a result, if the output value of the document detection sensor S1 is a value indicating that there is the document D, the process proceeds to Step S12.

When the process proceeds to Step S12, the document conveyance control section 120 determines whether or not a jam has occurred before the cover is opened and closed. That is, the document conveyance control section 120 determines whether or not a jam has occurred before the output value of the opening and closing switch CS changes from a value indicating an opened state of the cover CV to a closed state thereof. As a result, if the document conveyance control section 120 determines that a jam has occurred before the cover CV is opened and closed, the process proceeds to Step S13.

Figure 11:
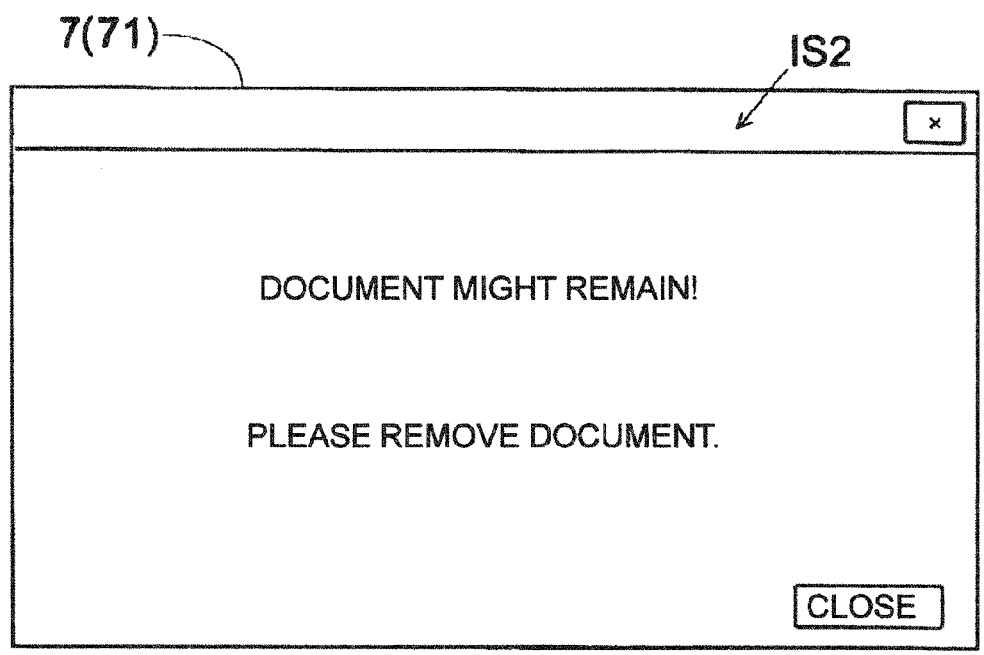
FIG. 11 is a view illustrating an example of a report screen displayed in the document conveyance apparatus according to the embodiment.

When the process proceeds to Step S13, the document conveyance control section 120 notifies the main control section 110 of determination results of Step S11 and Step S12. The main control section 110 that has received the notification causes the operation panel 7 to report that the document D remains on the document conveyance path 11. For example, the operation panel 7 displays a report screen IS2 illustrated in FIG. 11. A message indicating that there is a probability that the document D remains on the document conveyance path 11, a message that urges to remove the document D remaining on the document conveyance path 11, or the like, is provided on the report screen IS2.

However, there is also a probability that, although the document D does not remain in the detection position P1 on the document conveyance path 11, the output value of the document detection sensor S1 is a value indicating that there is the document D (that is, there is also a probability that the cover CV is in a half-closed state), and therefore, it may be reported that the cover CV is in a half-closed state at the same time as it is reported that the document D remains on the document conveyance path 11.

On the other hand, in Step S12, if the document conveyance control section 120 determines that a jam has not occurred before the cover CV is opened and closed, the process proceeds to Step S14. When the process proceeds to Step S14, the document conveyance control section 120 notifies the main control section 110 of determination results of Step S11 and Step S12. The main control section 110 that has received the notification causes the operation panel 7 to report that the cover CV is in a half-closed state. That is, the operation panel 7 displays the report screen IS1 illustrated in FIG. 8.

In Step S11, if the output value of the document detection sensor S1 is a value indicating that there is not the document D, the process proceeds to Step S15. When the process proceeds to Step S15, the document conveyance control section 120 causes the document conveyance apparatus 1 to wait in a ready state. That is, the document conveyance control section 120 causes the document conveyance apparatus 1 to wait in a state where conveyance of the document D may be performed. Also, the document conveyance control section 120 notifies the main control section 110 that the document conveyance apparatus 1 is in a ready state.

As described above, the document conveyance apparatus 1 according to this embodiment includes the document conveyance section 20 configured to feed the document D to the document conveyance path 11 and convey the document D along the document conveyance path 11, the cover CV attached to the apparatus body so as to be openable and closable and configured to cause, when being opened, the inner side of the document conveyance path 11 to be exposed, the opening and closing switch CS as an opening and closing sensor configured to cause an output value to change in accordance with opening and closing of the cover CV, the document detection sensor S1 that is a sensor configured to cause an output to change in accordance with whether or not there is the document D in the detection position P1 as a predetermined detection position on the document conveyance path 11 and a sensor that outputs, when the cover CV is not completely closed, a value indicating that there is the document D, and the document conveyance control section 120 as a control section configured to detect opening and closing of the cover CV on the basis of the output value of the opening and closing switch CS and detect whether or not there is the document D in the detection position P1 on the basis of the output value of the document detection sensor S1. If, when the output value of the opening and closing switch CS has changed from a value indicating an opened state of the cover CV to a closed state thereof, the output value of the document detection sensor S1 is a value indicating that there is the document D, the document conveyance control section 120 detects a half-closed state where the cover CV is not completely closed.

In the configuration according to this embodiment, when the cover CV is closed, the output value of the opening and closing switch CS changes from a value indicating an opened state of the cover CV to a closed state thereof. In this case, if the cover CV is completely closed, the output value of the document detection sensor S1 is a value indicating that there is not the document D, while, if the cover CV is not completely closed, the output value of the document detection sensor S1 is a value indicating that there is the document D. Thus, if, when the output value of the opening and closing switch CS has changed from a value indicating an opened state of the cover CV to a value indicating a closed state, the output value of the document detection sensor S1 is a value indicating that there is the document D, the document conveyance control section 120 detects that the cover CV is in a half-closed state. Thus, whether or not the cover CV is in a half-closed state may be reliably detected in a simple manner.

According to this embodiment, as described above, the document conveyance apparatus 1 includes the actuator 10 pivotally attached to the cover CV. The actuator 10 includes the contact part 10c that the front end of the document D that has reached the detection position P1 on the document conveyance path 11 contacts and thus is pressed in the conveyance direction, and the detected part 10d that is located in the detection area of the document detection sensor S1 when there is not the document D in the detection position P1 on the document conveyance path 11 and, on the other hand, is located in a position off the detection area of the document detection sensor S1 when there is the document D in the detection position P1 or when the cover CV is in a half-closed state. The revolving part 10a of the actuator 10 is a detection target, and thus, the document detection sensor S1 causes the output value to change in accordance with whether or not there is the document D in the detection position P1 and outputs, when the cover CV is not completely closed, a value indicating that there is the document D. By configuring in the above-described manner, a sensor configured to cause an output to change in accordance with whether or not there is the document D in the detection position P1 and output, when the cover CV is not completely closed, a value indicating that there is the document D may be achieved in a simple manner.

According to this embodiment, as described above, when the document conveyance control section 120 detects that the cover CV is in a half-closed state, feeding of the document D to the document conveyance path 11 by the document conveyance section 20 is not started. By configuring in the above-described manner, if the cover CV is in a half-closed state, conveyance of the document D is not performed. Thus, the occurrence of a jam caused by the cover CV being in a half-closed state may be reduced. Therefore, jam processing is not needed to be performed and thus convenience of a user may be increased.

According to this embodiment, as described above, when the document conveyance control section 120 detects a half-closed state of the cover CV, the operation panel 7 (a report section) reports that the cover CV is in a half-closed state. By configuring in the above-described manner, a user may be caused to recognize that the cover CV is in a half-closed state in a simple manner.

According to this embodiment, as described above, in a case where the cover CV is opened because of the occurrence of a jam, if, when the output value of the opening and closing switch CS has changed from a value indicating an opened state of the cover CV to a value indicating a closed state thereof after the occurrence of the jam, the output value of the document detection sensor S1 is a value indicating that there is the document D, the operation panel 7 reports that there is a probability that the document D remains in the document conveyance path 11. Thus, if there is a probability that the document D remains in the detection position P1 on the document conveyance path 11, a user may recognize so, and thus, convenience of the user may be increased.

The embodiment disclosed herein is merely an example in every aspect, and should not be limitedly interpreted. The scope of the present disclosure is by no means limited by the text of the above-described embodiment but is indicated by the scope of the claims, and further, all alterations belonging to the scope of equivalents of the claims are within the scope of the present disclosure.

What is claimed is:

1. A document conveyance apparatus comprising:
    a document conveyance section configured to feed a document to a document conveyance path and convey the document along the document conveyance path;
    a cover attached to an apparatus body so as to be openable and closable and configured to cause, when being opened, an inner side of the document conveyance path to be exposed;
    an opening and closing detection sensor configured to cause an output value to change in accordance with opening and closing of the cover;
    a document detection sensor that is a sensor that detects reaching of the front end of the document and passing of the rear end thereof in the predetermined position of the document conveyance path and that is configured to cause an output value to change in accordance with whether or not there is the document in a predetermined detection position on the document conveyance path and that is a sensor configured to output, when the cover is not completely closed, a value indicating that there is the document;
    a control section configured to detect opening and closing of the cover on the basis of the output value of the opening and closing detection sensor and detect whether or not there is the document in the predetermined detection position on the basis of the output value of the document detection sensor, and
    a report section configured to report an apparatus state,
    wherein, if, when the output value of the opening and closing detection sensor has changed from a value indicating an opened state of the cover to a value indicating a closed state thereof, the output value of the document detection sensor is a value indicating that there is the document, the control section detects a half-closed state where the cover is not completely closed,
    in a case where the cover is opened because of the occurrence of a jam, if, when the output value of the opening and closing detection sensor has changed from a value indicating an opened state of the cover to a value indicating a closed state thereof after the occurrence of the jam, the output value of the document detection sensor is a value indicating that there is the document, the control section causes the report section to report that there is a probability that the document remains in the document conveyance path, and the report section reports that the cover is in a half-closed state at the same time as reporting that there is a probability that the document remains on the document conveyance path.

2. The document conveyance apparatus according to claim 1 further comprising:

an actuator pivotally attached to the cover, wherein the actuator includes a contact part that a front end of the document that has reached the predetermined detection position contacts and thus is pressed in a conveyance direction, and a detected part that is located in a detection area of the document detection sensor when there is not the document in the predetermined detection position and, on the other hand, is located in a position off the detection area of the document detection sensor when there is the document in the predetermined detection position or when the cover is in the half-closed state, and the document detection sensor causes the output value to change in accordance with whether or not there is the document in the predetermined position and outputs a value indicating that there is the document when the cover is in the half-closed state.

3. The document conveyance apparatus according to claim 2, wherein the actuator is located facing to the detection area when there is no document in the predetermined detection position and the cover is completely closed.

4. The document conveyance apparatus according to claim 1, wherein, when the control section detects that the cover is in the half-closed state, the document conveyance section does not start feeding of the document to the document conveyance path.

5. An image forming apparatus comprising:

the document conveyance apparatus according to claim 1.

6. The document conveyance apparatus according to claim 1, wherein the opening and closing detection sensor is disposed in a peripheral part of the paper feeding unit, and the document detection sensor is disposed between a paper feeding unit and a registration roller pair on the document conveyance path.

\* \* \* \* \*